(12) United States Patent
DeLong

(10) Patent No.: US 7,086,294 B2
(45) Date of Patent: Aug. 8, 2006

(54) RETRIEVABLE DOWNHOLE FLOW METER

(75) Inventor: Robert C. DeLong, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/061,159

(22) Filed: Feb. 18, 2005

(65) Prior Publication Data

US 2005/0183515 A1   Aug. 25, 2005

Related U.S. Application Data

(60) Provisional application No. 60/546,865, filed on Feb. 23, 2004.

(51) Int. Cl.
*G01F 1/44* (2006.01)

(52) U.S. Cl. .................................... 73/861.63
(58) Field of Classification Search ............. 73/152.18, 73/152.21, 152, 861.63
See application file for complete search history.

(56) References Cited

U.S. PATENT DOCUMENTS

| | | | |
|---|---|---|---|
| 3,176,304 A | 3/1965 | Peters et al. | |
| 3,224,267 A | 12/1965 | Harlan et al. | |
| 4,852,401 A | 8/1989 | Hrametz et al. | |
| 4,941,951 A * | 7/1990 | Sheppard et al. | ............ 175/48 |
| 5,631,413 A * | 5/1997 | Young et al. | ............ 73/152.29 |
| 6,263,730 B1 | 7/2001 | Grande et al. | |

* cited by examiner

*Primary Examiner*—Jewel V. Thompson
(74) *Attorney, Agent, or Firm*—Bracewell & Giuliani LLP

(57) ABSTRACT

A well has a downhole flow meter that is installed in a sub in a string of tubing. The flow meter has a body having an external profile that lands on a landing profile in the sub. The body has a passage with a throat area of reduced diameter. Upstream and downstream body ports in a side wall of the body are in fluid communication with the throat area and a downstream portion of the passage downstream of the throat area. Seals are located between the body and the sub, defining an upstream annular chamber and a downstream annular chamber surrounding the body, the chambers being in communication with the upstream and downstream body ports. Upstream and downstream sub ports in a side wall of the sub are in fluid communication with the upstream and downstream chambers. A sensor circuit is in operative engagement with the sub ports for determining a flow rate based on a pressure difference sensed between the throat area and the downstream portion of the passage in the body.

20 Claims, 1 Drawing Sheet

Fig. 1
Fig. 2
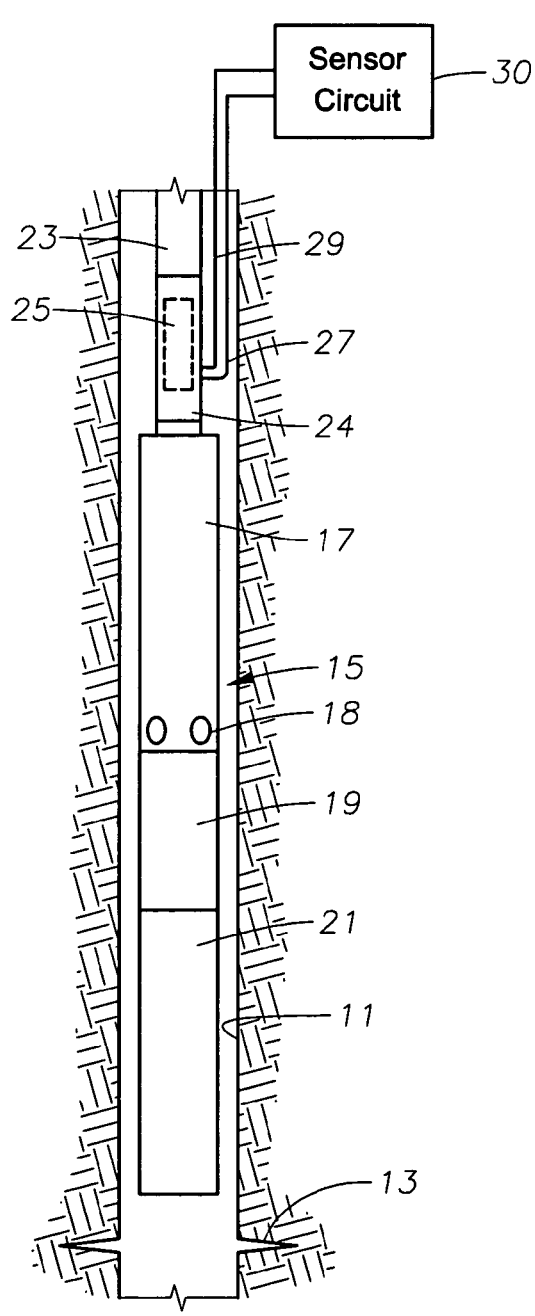
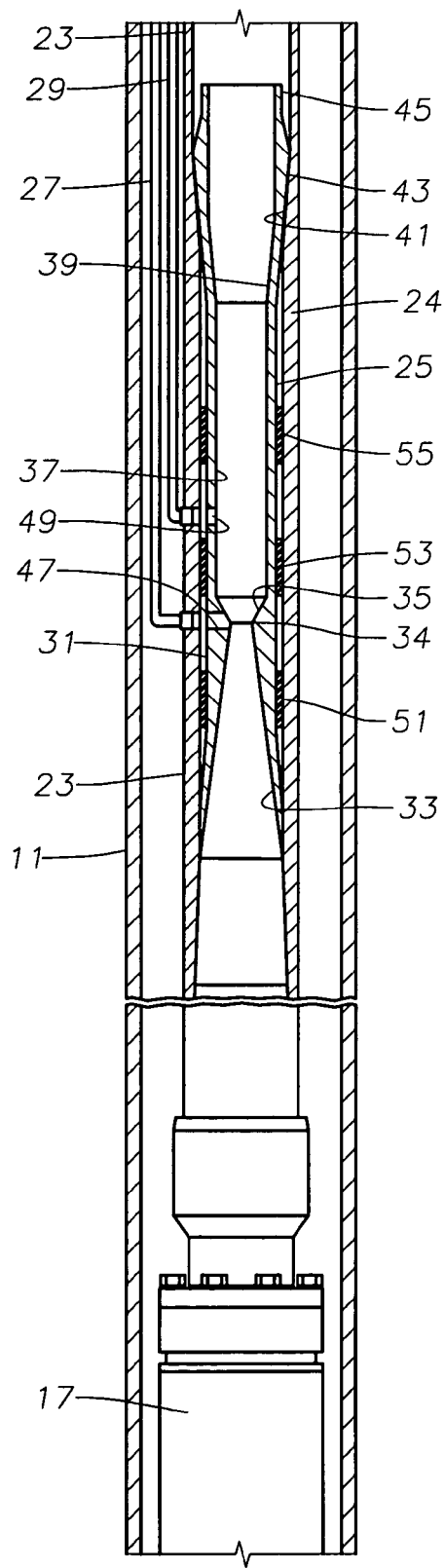

RETRIEVABLE DOWNHOLE FLOW METER

CROSS-REFERENCE TO RELATED APPLICATION

This application claims priority to provisional application 60/546,865, filed Feb. 23, 2004.

FIELD OF THE INVENTION

This invention relates in general to oil well production, and in particular to a downhole flow meter for monitoring the flow of production fluid flowing up the tubing.

BACKGROUND OF THE INVENTION

Many oil wells employ electrically driven submersible pumps to pump the well fluid to the surface. In a typical well, the pump and motor are suspended on a string of production tubing, and the pump discharges the well fluid into the tubing. The pump may be a centrifugal pump ("ESP") having a large number of impeller and diffuser stages. A power cable extends alongside the tubing to the motor for supplying three-phase power. Progressing cavity pumps driven by downhole electrical motors are also used in some wells.

It is common for an ESP unit to have pressure and temperature sensors that transmit to the surface downhole pressure and temperature while the ESP is operating. Usually the pressure and temperature signals are superimposed on the motor power cable, and a surface electronic unit will detect the signals and provide readings.

Another useful parameter for an operator of an ESP driven well or a naturally flowing well is the flow rate of the well fluid. A variety of different flow meters exist that can be used at the surface for determining the flow rate at the surface. Downhole flow meters for wells have been employed with well surveys or production logging operations, particularly for natural pressure driven wells. In production logging, typically a downhole flow meter is lowered into the tubing on a cable. In one type, power is supplied to the flow meter through a conductor in the cable, and signals are transmitted to the surface while the well is allowed to flow. The downhole unit could be battery powered. Typically, a well survey using a flow meter is only performed periodically and for a short period of time. Normally, operators do not install downhole flow meters for continuous long term operation in ESP driven wells The flow rate at the surface is easily measured, but may differ from a flow rate measured downhole Downhole, free gas produced by the well is more likely entrained in the well fluid or is in solution, thus will not affect a downhole flow meter reading. At the surface, much of the gas typically comes out of solution because of the lower pressure. Gassy fluid flow rates can not be accurately or easily monitored once the gas has come out of solution.

SUMMARY OF THE INVENTION

In this invention, a flow meter is installed within a sub in the production tubing. The sub has a bore with a landing profile for receiving the flow meter body. The flow meter body has a passage therethrough. The sub has upstream and downstream ports in its sidewall that are in fluid communication with the flow meter passage at upstream and downstream points. A sensor circuit is in fluid communication with the sub ports for determining a flow rate of fluid flowing through the flow meter passage based on a pressure difference between the upstream and downstream points.

In the embodiment shown, the sensor circuit is located at the surface of the well. A small diameter tube extends from each sub port alongside the production tubing to the surface for communicating the pressure differential. Alternately, the sensor circuit could be located downhole and transmit its signals on the power cable.

Preferably, the passage in the flow meter body has a throat area and a diverging area that joins and is downstream from the throat area. A port extends through the side wall of the flow meter body at the throat area. Another port extends through the side wall of the flow meter body in the diverging area. Seals are located on the exterior of the body for sealing to the bore of the sub. The seals are positioned to define an annular upstream chamber surrounding the throat port and a downstream chamber surrounding the port in the diverging area.

BRIEF DESCRIPTION OF THE DRAWINGS

FIG. 1 is a schematic view illustrating an electrical submersible pump assembly located within a well and having a downhole retrievable flow meter in accordance with this invention.

FIG. 2 is an enlarged sectional view of the flow meter of FIG. 1.

DETAILED DESCRIPTION OF THE INVENTION

Referring to FIG. 1, the well has a casing 11 containing a set of perforations 13 to allow fluid flow from an earth formation into casing 11. An electrical submersible pump assembly ("ESP") 15 is suspended in casing 11.

ESP assembly 15 includes a pump 17, which is typically a centrifugal pump having a large number of stages of impellers and diffusers and an intake 18. Alternately, pump 17 could be a progressive cavity pump utilizing a helical rotor that rotates within a helical elastomeric stator. Pump 17 is connected on its lower end to a seal section 19. An electrical motor 21 mounts to the lower end of seal section 19. Motor 21 rotates a shaft that is coupled to shafts (not shown) in seal section 19 and pump 17 for driving pump 17. Motor 21 is filled with a dielectric lubricant, and seal section 19 equalizes the lubricant pressure with the hydrostatic pressure in well casing 11.

A string of tubing 23 extends from ESP assembly 15 to the surface. Tubing 23 is typically production tubing made up of sections of tubing about thirty feet in length that are secured together by threads. A flow meter sub 24 is mounted in the string of tubing 23, preferably at the upper end of pump 17. Flow meter sub 24 contains a retrievable flow meter 25 for determining the flow rate of the well fluid being discharged by pump 17. Flow meter 25 is preferably a venturi-type. Upstream and downstream capillary tubes 27, 29 extend alongside tubing 23 and monitor a pressure drop through flow meter 25 to calculate the flow rate. Tubes 27, 29 communicate with a sensor circuit 30 that is shown at the surface in this embodiment. Sensor circuit 30 provides a display of the flow rate based on the pressure difference sensed.

Referring to FIG. 2, flow meter 25 has a tubular body 31 that lands within flow meter sub 24. Body 31 has a flow passage extending through it that has a first section 33 that is conical, with a minimum diameter or throat 34 at its upper or downstream end. Throat 34 joins a second section 35.

Second section 35 is conical, but diverges from throat 34 in a downstream direction. In this embodiment, second section 35 has a length much shorter than first section 33. A third section 37 extends from second section 35 and is cylindrical in this embodiment. Optionally, the passage could also include a fourth section 39 that is slightly flared.

A landing profile 41 comprising an upward facing tapered shoulder is located in flow meter sub 24. Body 31 has a mating landing profile 43 that lands on profile 41. The engagement creates a wedging fit that is sufficient to resist body 31 being dislodged by upward flowing fluid being discharged from pump 17. A fishing neck 45 at the upper end of body 31 allows flow meter 25 to be engaged by a fishing tool and pulled to the surface.

A throat pressure port 47 extends laterally through the sidewall of body 31 from throat 34. A downstream pressure port 49 is located above throat pressure port 47 in third portion 37 of the passage.

A first seal 51 seals between the outer diameter of body 31 and the exterior of flow meter sub 24 at a point upstream or below first pressure port 47. A second seal 53 seals between the outer diameter of body 31 and flow meter sub 24 at a point between pressure ports 47, 49. A third seal 55 seals between body 31 and the inner diameter of flow meter sub 24 at a point above downstream pressure port 49 and below seating profile 43.

Seating profiles 41, 43 are located for communicating tube 27 with throat pressure port 47 and the annular chamber created between first and second seals 51, 53. Similarly, second tube 29 communicates with downstream pressure port 49 and the annular chamber created by seals 53, 55. Tubes 27, 29 convey the pressure difference to sensor circuit 30, which is located at the surface in this embodiment.

During installation, an operator lowers ESP assembly 15 on tubing 23. The operator also lowers pressure sensing tubes 27, 29 at the same time. Preferably, flow meter 25 will be installed within tubing 23 while still at the surface, then lowered along with tubing 23. Alternately, flow meter 25 could be lowered into tubing 23 on a wireline and landed in profile 41.

During operation, the operator supplies electrical power to pump motor 21 via a power cable (not shown), leading from motor 21 to a power supply at the surface. Pump motor 21 rotates pump 17, causing fluid from perforations 13 to flow up tubing 23. As the well fluid flows through the passage of flow meter 25, a pressure drop will occur in throat 34 relative to third passage section 37. The pressure drop is communicated to sensor circuit 30 via tubes 27, 29. Circuit 30 senses the pressure difference and computes a flow rate based on the pressure difference and various parameters provided. Sensor circuit 30 provides a readout and optionally may include a transmitter that transmits the information in digital or analog format to a central location.

As another alternative, pressure sensing tubes 27, 29 could lead to a downhole circuit that converts the pressure difference to an electrical signal that is superimposed on the power cable and transmitted to the surface. For example, the downhole circuit could be located in a housing (not shown) on the lower end of motor 21. The housing might also contain pressure and temperature monitoring sensors and circuitry. At the surface, the signal could be picked off the power cable and transmitted to a central location.

The invention has significant advantages. The downhole flow meter provides more accurate readings of flow rate than a surface flow meter, particularly for gassy well fluids. The flow meter operates continuously, and in the preferred embodiment, has no moving parts. There is no requirement for a cable to extend down the tubing to supply power to the flow meter. The flow meter can be retrieved on wireline for maintenance or replacement without having to pull the tubing or pump.

While the invention has been shown in only one of its forms, it should be apparent to those skilled in the art that it is not so limited but is susceptible to various changes without departing from the scope of the invention. For example, although shown with an ESP unit, the flow meter could be employed in a natural pressure driven, or flowing well.

I claim:

1. A well, comprising:
   a string of tubing suspended in the well for flowing well fluid to a top of the well;
   a tubular sub having threaded ends connected into the string of tubing, the sub having a bore with a landing profile;
   a flow meter body lowered through and retrieved from the string of tubing and which lands on the landing profile, the flow meter body having a passage therethrough for the well fluid flowing up the string of tubing;
   upstream and downstream sub ports in a sidewall of the sub that are in fluid communication with the passage at upstream and downstream points, respectively, in the passage; and
   a sensor circuit in fluid communication with the sub ports for determining a flow rate of the well fluid flowing through the passage based on a pressure difference between the upstream and downstream points.

2. The well according to claim 1, wherein the upstream point in the passage is located within a throat of reduced diameter.

3. The well according to claim 1, further comprising an upstream tube extending from the upstream sub port to the sensor circuit to communicate fluid pressure at the upstream point to the sensor circuit, and a downstream tube extending from the downstream sub port to the sensor circuit to communicate fluid pressure at the downstream point to the sensor circuit.

4. The well according to claim 1, further comprising a fishing neck on an upper end of the flow meter body for engagement by a fishing tool to retrieve the flow meter body from the sub and through the string of tubing.

5. The well according to claim 1, further comprising a seal that seals an exterior portion of the flow meter body to the sub.

6. The well according to claim 1, further comprising:
   an upstream body port extending from the passage through a sidewall of the flow meter body adjacent to the upstream point;
   a downstream body port extending from the passage through the sidewall of the flow meter body adjacent to the downstream point; and
   a plurality of seals on the exterior of the flow meter body that seal the body to the sub, the seals being axially spaced apart to define an upstream chamber in fluid communication with the upstream sub port and a downstream chamber in fluid communication with the downstream fluid port.

7. The well according to claim 1, wherein the landing profile comprises a tapered surface.

8. The well according to claim 1, wherein the passage comprises:
   a converging section;
   a throat area joining and downstream of the converging section;

a diverging section joining and downstream of the throat area; wherein the upstream sub port is in fluid communication with the throat area; and fthe downstream sub port is in fluid communication with the diverging section.

9. In a well having a casing and a string of tubing, the improvement comprising:

a sub in the string of tubing, the sub having a bore containing a landing profile;

a flow meter body having an external profile that lands on the landing profile and a passage therethrough, the passage having a throat area of reduced diameter;

upstream and downstream body ports in a side wall of the body that are in fluid communication with the throat area and a downstream portion of the passage downstream of the throat area;

seals located between the body and the sub defining an upstream annular chamber and a downstream annular chamber surrounding the body, the chambers being in communication with the upstream and downstream body ports, respectively;

upstream and downstream sub ports in a side wall of the sub that are in fluid communication with the upstream and downstream chambers, respectively; and a sensor circuit in operative engagement with the sub ports for determining a flow rate based on a pressure difference sensed between the throat area and the downstream portion of the passage in the body.

10. The well according to claim 9, further comprising:

an upstream tube extending from the upstream sub port to the sensor circuit to communicate fluid pressure at the upstream chamber to the sensor circuit, and a downstream tube extending from the downstream sub port to the sensor circuit to communicate fluid pressure at the downstream chamber to the sensor circuit.

11. The well according to claim 9, wherein the sensor circuit is located at an upper end of the well, and wherein the well further comprises:

an upstream tube extending alongside the tubing from the upstream sub port to the sensor circuit to communicate fluid pressure at the upstream chamber to the sensor circuit;

a downstream tube extending alongside the tubing from the downstream sub port to the sensor circuit to communicate fluid pressure at the downstream chamber to the sensor circuit.

12. The well according to claim 9, further comprising a fishing neck on a upper end of the flow meter body for engagement by a fishing tool to retrieve the flow meter body from the sub.

13. The well according to claim 9, wherein the landing profile comprises a tapered surface.

14. The well according to claim 9, wherein the passage comprises:

a converging section upstream from and joining the throat area;

a diverging section joining and downstream of the throat area; wherein the downstream sub port is in fluid communication with the diverging section.

15. The well according to claim 9, further comprising:

an electrically driven submersible pump suspended below the sub, the pump discharging into the sub.

16. A method of measuring flow rate within a well, comprising:

(a) connecting a tubular sub into a string of well tubing, the sub having a bore with upstream and downstream sub ports extending through its side wall;

(b) placing a flow meter body in the sub, the flow meter body having a passage therethrough;

(c) lowering the tubing into the well;

(d) flowing well fluid upward through the sub, the passage in the body and the tubing, the body being positioned in the sub such that the upstream and downstream sub ports are in fluid communication with the well fluid flowing through the passage at upstream and downstream points, respectively; and (e) sensing a difference between the fluid pressures at the sub ports and determining a flow rate of the fluid flowing through the passage based on the pressure difference sensed.

17. The method according to claim 16, further comprising lowering a wireline through the tubing, engaging the body and retrieving the body to the top of the well for repair or replacement.

18. The method according to claim 16, further comprising connecting tubes from each of the sub ports to a sensor circuit located exterior of the sub; and step (e) comprises fluid communicating the pressures at the sub ports to the sensor circuit.

19. The method according to claim 16, further comprising connecting a tube to each of the sub ports and extending the tubes alongside the tubing to a sensor circuit located at the top of the well; and step (e) comprises fluid communicating the pressures at the sub ports to the sensor circuit.

20. The method according to claim 16, further comprising connecting an electrically driven submersible pump to the tubing below the sub; and step (d) comprises rotating the pump to pump fluid through the flow meter body.

\* \* \* \* \*

UNITED STATES PATENT AND TRADEMARK OFFICE
CERTIFICATE OF CORRECTION

| | | |
|---|---|---|
| PATENT NO. | : 7,086,294 B2 | Page 1 of 1 |
| APPLICATION NO. | : 11/061159 | |
| DATED | : August 8, 2006 | |
| INVENTOR(S) | : Delong | |

It is certified that error appears in the above-identified patent and that said Letters Patent is hereby corrected as shown below:

Column 5, line 5, delete "fthe" and insert --the--

Signed and Sealed this

Thirtieth Day of January, 2007

JON W. DUDAS
*Director of the United States Patent and Trademark Office*